United States Patent [19]

Outlaw et al.

[11] 3,780,563

[45] Dec. 25, 1973

[54] INSITU TRANSFER STANDARD FOR ULTRA-HIGH VACUUM GAGE CALIBRATION

[75] Inventors: Ronald A. Outlaw, Newport News; Richard E. Stell, Hampton; Ronald F. Hoyt, Tabb, all of Va.

[73] Assignee: The United States of America as represented by the Administrator of the National Aeronautics and Space Administration, Washington, D.C.

[22] Filed: July 14, 1972

[21] Appl. No.: 271,951

[52] U.S. Cl. .................................................. 73/4 V
[51] Int. Cl. ........................................... G01l 27/00
[58] Field of Search ..................... 73/1 R, 4 R, 4 V; 138/44, 45

[56] References Cited
UNITED STATES PATENTS

| | | | |
|---|---|---|---|
| 3,395,565 | 8/1968 | Brock et al. | 73/4 V |
| 2,678,066 | 5/1954 | Carter | 138/45 |
| 2,707,488 | 5/1955 | Overdisk | 138/44 |

*Primary Examiner*—S. Clement Swisher
*Attorney*—Howard J. Osborn et al.

[57] ABSTRACT

A compact insitu calibration assembly for ultra high vacuum gauges which depends on the repeatable generation of a specific gas pressure by the dissociation of a solid solution chemical compound when subjected to a given temperature.

A precise temperature measurement is related to the pressure generated within the vacuum by the properties of the solid solution compound. This accurately establishes the gas pressure which in turn is used to calibrate a vacuum gauge. Also included is a metering orifice used in the calibration system and which is made movable to facilitate the degassing bakeout required in ultra high vacuum devices.

12 Claims, 3 Drawing Figures

INSITU TRANSFER STANDARD FOR ULTRA-HIGH VACUUM GAGE CALIBRATION

ORIGIN OF THE INVENTION

The invention described herein was made by employees of the United States Government and may be manufactured and used by or for the government for governmental purposes without payment of any royalties thereon or therefor.

BACKGROUND OF THE DISCLOSURE

This invention relates generally to the calibration of vacuum gauges and more specifically to a gas pressure source for use as a standard in the two conventional systems of vacuum gauge calibration.

One system is a static system in which the vacuum pump is valved off or inoperative and a gas source is connected directly to the vacuum chamber to which the gauge to be calibrated is attached. The pressure is raised in the gas source and given sufficient time to reach equilibrium within the connected vacuum chamber and vacuum gauge. The pressure in the gas source is then accurately read by any pressure-measuring device of sufficient accuracy and accepted as the gauge calibration.

Another system used is dynamic in that a vacuum pump is operative during the calibration operation and the system is continuously pumped. This procedure permits calibration at lower pressures than the static system and minimizes contaminants. It is the preferred calibration procedure for ultra high vacuum systems. This system consists of isolating the gas source from the vacuum chamber and vacuum gauge through a metering orifice which has a known conductance. The vacuum pump is likewise isolated from the vacuum chamber and vacuum gauge by another known conductance. Thus, the flow of gas is continuous from the gas source through the metering orifice into the vacuum chamber and gauge and then out of the chamber and gauge through the pump orifice and into the pump. The system is operated with the two conductances selected to allow the stabilization of the two different pressures in the gas source and in the vacuum chamber to which the gauge is attached. The pressure in the gauge is then a function only of the two conductances and the pressures in the gas source. Since the conductances are fixed and calculable from geometric measurements, an accurate reading of the pressure of the gas sources is all that is required to establish the gauge calibration. The devices used to measure this gas source pressure precisely have generally been so complex, large and sensitive that gauge calibration has required removal of the gauge from the working system and its placement on a special calibration system. This involves a great deal of time and effort because any removal from or attachment to a vacuum system requires bleeding the system to air pressure and then reestablishing vacuum including performing a cleansing bakeout to remove entrapped air and vapors from the components within the vacuum system.

SUMMARY OF THE DISCLOSURE

This invention consists of an assembly containing a metal-gas binary powder which when heated dissociates to yield gas. The pressure of the gas produced is directly dependent on the temperature to which the binary powder is raised, so that the pressure calibration of a vacuum system may be directly related to a simple temperature measurement. The solid binary powder form in which the gas is stored yields a high quantity of gas for the storage volume making the invention extremely compact. No gas bottles, tanks, hoses or pipes are required to be attached to the assembly. To use the system, it need only be bolted to the vacuum chamber and a heater control and temperature measuring device attached to it. The invention is compact enough to cause no interference when left in place on a working vacuum system and the simplicity of construction and operation makes it practical to maintain such calibration systems on many separate vacuum systems. The relation of pressure to temperature via the dissociation of the binary compound transfers the calibration of the vacuum gauges to parameters completely independent of those used in the working gauges and furnishes a new means of checking for changed conditions. The compact gas source also permits the change of calibration gas by the simple unbolting and exchange of a small assembly.

The invention also includes a retractable metering orifice which when in use performs the function of one of the conductances required for the accepted calibration method, but which may be retracted to allow for complete rapid degassing of the assembly.

To properly operate any device in an ultra high vacuum environment it must be properly heated to a relatively high temperature while subject to a constant pumping action sufficient to remove all contaminant gases and vapors. If the metered orifice of relatively low conductance were to be left in place during this bakeout, the degassing procedure would be lengthy and impractical due to the slow diffusion of gases through the conductance. The invention therefore includes the retracting mechanism which withdraws the orifice from its prosition in the assembly exit port so that during the bakeout the conductance of the assembly exit port is increased many orders or magnitude and thus the bakeout and degassing process are greatly decreased in time.

This retracting mechanism gives the assembly the potential of being used in either the static or dynamic calibration systems described under background material. This widens the range of potential calibration pressures available in a particular system.

DETAILED DESCRIPTION OF THE INVENTION

Figure 1:
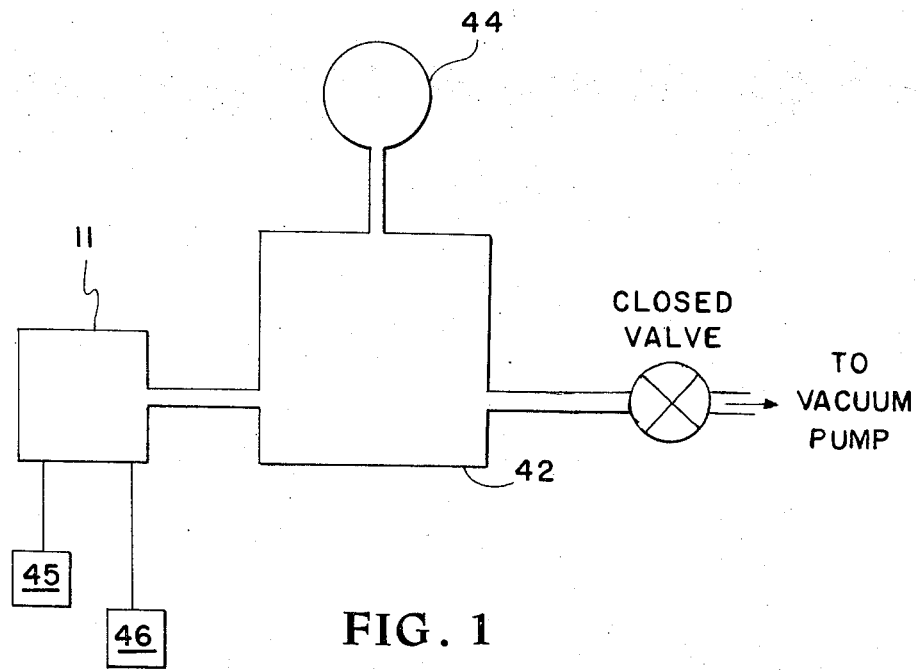
FIG. 1 is a simplified schematic diagram of the static calibration system in which the invention is used.

One procedure for operating the transfer standard for the calibration of a vacuum gauge is shown in FIG. 1. In this system the vacuum gauge 44, the vacuum chamber 42, and the gas pressure source assembly 11 are evacuated to the minimum pressure capability of the vacuum pump. The vacuum valve on the pump input is then closed to isolate the vacuum system from the pump. The gas pressure adjustment device 45 is operated to generate a specific pressure in the gas source 11 which is given sufficient time to diffuse into the vacuum chamber 42 and gauge 44 before being accurately measured by the pressure measuring device 46. The pressure read in the gas source 11 is used as the direct calibration of the gauge 44.

Figure 2:
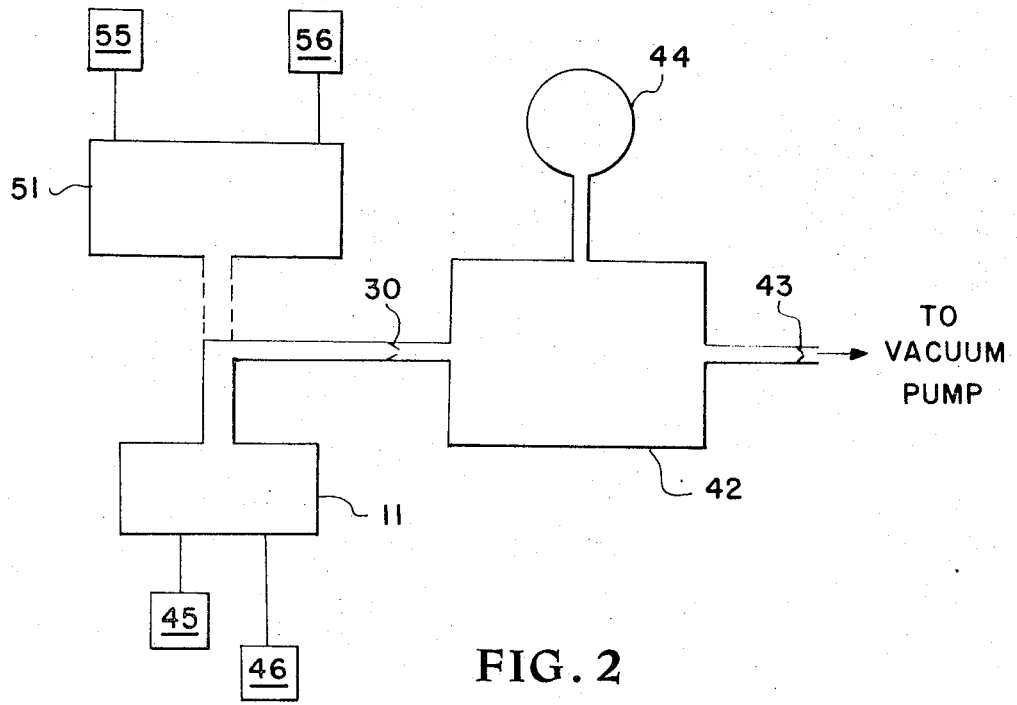
FIG. 2 is a simplified schematic diagram of the dynamic calibration system in which the invention is used.

The dynamic system of vacuum gauge calibration is shown in FIG. 2. This technique for calibration consists of partially isolating the gas pressure source assembly 11 from the vacuum chamber 42 and vacuum gauge 44 by means of a metering orifice 30. The vacuum pump is also partially isolated from the vacuum chamber 42 and the gauge 44 by the use of pump orifice 43. In this system the gas flow is continuous from the gas pressure source 11, through the metering orifice 30, into the vacuum chamber 42 and vacuum gauge 44 and out through the pump orifice 43 to the vacuum pump. This continuous pumping permits a calibration pressure in the ultra high vacuum range and minimizes contaminating gases and vapors. To calibrate the gauge 44, the gas pressure in the source 11 is raised by use of the pressure adjustment device 45 and time is permitted to elapse for the pressures in the system to stabilize. The pressure in the vacuum chamber 42 is then lower than the pressure in the gas pressure source assembly 11 and is related to it by a strict mathematical relationship dependent only upon the conductances of the pump orifice 43 and the metering orifice 30. These conductances and calculable from conventional geometric measurements and do not change with either the gas or the gas pressure. Thus, once they are established the pressure in the gauge 44 to be calibrated is a direct function of the pressure in the gas pressure source assembly 11 as measured by the pressure measuring device 46.

A variation of the dynamic calibration technique may be used where the interest is in calibration of the gauge 44 with more than one type of gas. In such a case, a multiplicity of gas pressure sources may be attached to the vacuum chamber. In FIG. 2, a second gas source is shown attached by dotted lines. In such a case, gas pressure source assembly 51 is identical in structure to gas pressure source assembly 11 except for the type of gas available. The gas available for calibration is then determined by the use of the particular pressure adjustment device 45 or 55 used while the calibration is taken from the appropriate pressure measuring device 46 or 56.

STRUCTURE OF THE INVENTION

Figure 3:
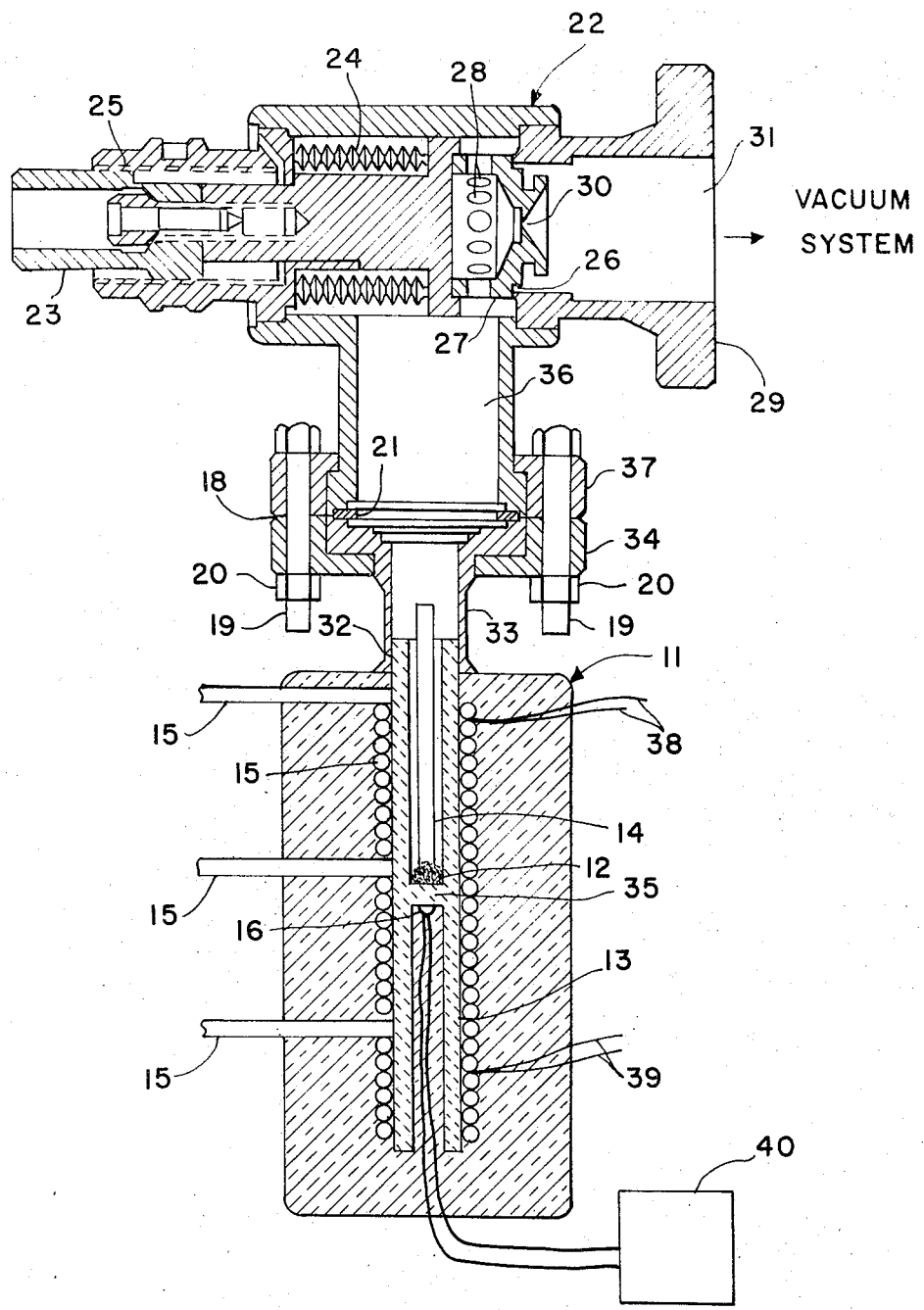
FIG. 3 is a sectional side view of the Transfer Standard Assembly with the retractable orifice in the position closing the assembly exit port.

Turning now to FIG. 3 which shows the detailed specific embodiment of this invention, the invention consists of a gas pressure source assembly 11 and an adapter assembly 22.

The gas pressure source assembly consists of an aluminum oxide vertical ceramic cylinder 13 which is closed off at its axial midpoint 35 and at its top is bonded to a vertical metal tube 33 by use of a ceramic to metal braze seal 32. The metal tube 33 is attached to a vacuum seal flange 34 which allows connection to the adapter assembly. Approximately .5 grams of erbium-hydrogen binary powder 12 is placed inside the ceramic cylinder 13 at the bottom of the contained formed by the midpoint closure 35 of the ceramic cylinder 13. A long cylindrical aluminum baffle 14 is placed over the erbium hydrogen binary powder 12 and extends into the area of the metal tube 33 above the ceramic cylinder 13. Three separate electrical heaters 15 are wrapped around the ceramic tube 13 over its entire length. Chromel alumel thermocouples are placed at the top of the electrical coil 38, the bottom of the coil 39, and on the underside of the midpoint closure 16. The entire length of the ceramic cylinder 13 and electrical coils 15 are wrapped with at least 1 inch thickness of glass fiber insulation 17 and the lower half of the ceramic cylinder is filled with fiber glass insulation.

The entire structure described above forms an oven to heat the erbium-hydrogen binary powder 12 when an electrical power source is attached to the electrical coils 15. The temperature distribution over the length of the ceramic tube 13 is essentially constant and may be verified by the use of the three thermocouples 16, 38, and 39. During operation only the thermocouple 16 which is placed at the midpoint of the ceramic tube 35 is attached to a thermocouple bridge temperature measuring instrument 40, shown diagramatically, in order to read the precise temperature of the binary powder 12.

At the top of the gas pressure source assembly 11 is a vacuum flange 34 which allows the gas pressure source to be easily attached to and removed from the adapter assembly 12 with a vacuum-tight seal 18. This seal consists of two vacuum flanges 34 and 37, one attached to each mating assembly which, when clamped together by bolts 19 and nuts 20, compress metal O-ring 21 preventing any leakage through the vacuum seal 18. When connected this forms one integral vacuum enclosure which includes the upper internal portion of the ceramic tube 13, the inside of the metal tube 33, and the lower cylinder 36 of the adapter assembly 22. This enclosure is bounded at one end by the midpoint closure 35 of ceramic tube 13 and at the other end by the hollow copper insert 27 which has a 1 mm orifice 30 leading to the vacuum system. The apertures 28 permit the flow of gas produced at the binary powder 12 to have free access to the orifice 30 which meters the flow into the vacuum system to which the adapter assembly 22 is attached by means of vacuum flange 29. The copper insert 27 is held tightly into the exit port 31 by the operator rod 23 to form a reclosable seal 26 and prevent gas leakage around the copper insert 27. The operator rod 23 moves on threads 25 outside the vacuum enclosure which is bounded in this area by bellows 24. The compression of the bellows 24 allows the operator rod 23 to retract without the requirement of a vacuum-tight seal between parts which move relative to each other. The copper insert 27 is attached to the operator rod 23 by a press fit. The insert 27 is thus easily removable so that it may be replaced for renewal of the reclosable seal 26 or for changing the value of the conductance. When the operator rod 23 is retracted it pulls the copper insert 27 away from the exit port 31 breaking the seal 26 and allowing free flow of gas to the vacuum system from the entire assembly during the cleansing bakeout prior to calibration. This bakeout is a vital part of operation of any ultra high vacuum device since it removes contaminant gases and vapors. However, if the metering orifice 30 were to remain in position during such a bakeout, the flow of contaminant gases to the vacuum system would be so limited by the low conductance of the orifice that the degassing procedure would be lengthy and impractical. With the copper insert 27 retracted from the exit port 31 the conductance is increased many orders of magnitude and the degassing time is dramatically reduced. The retraction of the copper insert is also required for the use of the gas pressure source assembly 11 in the static calibration system shown in FIG. 1, since that method requires the free flow of gas between the gas source 11 and the gauge 44 to be calibrated.

For operation in the dynamic calibration system, the copper insert 27 is resealed against the exit port 31 after the bakeout has sufficiently cleaned the vacuum system. The electrical heater coils 15 are then provided with electrical power from a variable source not shown in the drawing. This heats the erbium-hydrogen binary powder 12 and produces hydrogen gas. The erbium-hydrogen binary powder 12 functions in this invention because of its loss of thermodynamic freedom related to pressure which occurs when the material operates in a two-phase state. In such a two-phase state the metal and gas are in solution in solid form. Upon dissociation this solid solution exhibits a highly stable equilibrium pressure of gas which is independent of the relative concentrations of gas and metal in the solution but which is accurately repeatable with the temperature of the solution. Thus, at any particular temperature the gas pressure in the enclosure is always the same regardless of how much gas has been permitted to leak from the enclosure up to the limit of gas quantity which is reached when all the metal-gas binary has dissociated. Because of this firm relationship between the temperature of the metal-gas binary powder 12 and the gas pressure in the enclosure containing the powder, the electrical power control becomes a gas pressure adjustment device 45 as shown in FIGS. 1 and 2. Likewise, the thermocouple 16 at the midpoint 35 of the ceramic tube 13 acts as the pressure measuring device 46 in FIGS. 1 and 2 since the relationship between temperature of the metal-gas binary powder accurately determines the gas pressure in the enclosure defined by the orifice 30.

In the dynamic calibration technique of FIG. 2, the gas pressure in the gas pressure assembly 11 on one side of the orifice, which is accurately measured by the temperature of the thermocouple 16, is directly related to the gas pressure in the vacuum gauge 44. Therefore the true pressure reading of the gauge to be calibrated is established by reading the temperature of the thermocouple and relating it by previously determined relationships to the gauge pressure.

In actual operation, this system has been used with erbium-hydrogen powder and a 1 mm metering orifice to calibrate pressures from $1 \times 10^{-6}$ to $3 \times 10^{-10}$ Torr corresponding to erbium-hydrogen temperatures of 526°K. to 848°K. The use of the invention is not limited to erbium-hydrogen binary. While barium-nitrogen has also been demonstrated, any chemical which exhibits similar characteristics may be employed as a primary source of gas. The high quantity of gas available from such a solid solution yields several advantages for this invention. The device is extremely compact because of the minimal volume occupied by the binary powder and the gas pressure source assembly. No gas bottles, tanks, hoses or pipes need be attached to the system. To use the system, it need only be bolted to the vacuum chamber and connections made only to the electrical power source and the thermocouple temperature measuring bridge.

The amount of gas available from a solid solution compound also yields a very long useful life for the invention. Mass balance calculations indicate a minimum of four to eight months of continuous use of the erbium-hydrogen binary powder before depletion of the available gas. But since use of the source is far less than continuous when used as a calibration gas source, it yields virtually unlimited life.

The versatility of the invention is enhanced by compact construction and the ease with which the gas pressure source assembly may be replaced. It is not uncommon to desire calibration of vacuum gauges in different gas atmospheres to verify the gauge response to different impurities in the vacuum. In such cases, the calibration system should be capable of being converted to other gases with minimum effort. Because of the compact construction of the assembly, the availability of other metal-gas binary compounds, and the ease of disconnecting the gas pressure source assembly from the adapter assembly at the vacuum seal between them, a replacement assembly with the capability of generating a different gas may be installed in a very short time. It is also possible to mount two or more different gas source assemblies on the same vacuum system as shown in FIG. 2, thus allowing virtually instantaneous changeover to other calibration gases.

What is claimed as new and desired to be secured by Letters Patent of the United States is:

1. A calibration apparatus for an ultra high vacuum gauge means comprising:
   vacuum chamber means;
   vacuum gauge means to be calibrated associated with the vacuum chamber means;
   self-generating gas source enclosed within said vacuum chamber means for supplying precise pressure to said vacuum chamber means;
   means for limiting the conductance from said gas source means into said vacuum chamber means;
   means for negating said limiting effect upon the conductance between said gas source means and said vacuum chamber means; and
   measuring means to relate the gas pressure generated to the reading of the vacuum gauge means to be calibrated.

2. A calibration apparatus as in claim 1 wherein the self-generating gas source is metal-gas binary powder.

3. A calibration apparatus as in claim 1 wherein the self-generating gas source is a metal-gas compound.

4. A calibration apparatus as in claim 1 wherein the self-generating gas source is a solid solution compound.

5. A calibration apparatus as in claim 1 wherein the self-generating gas source is erbium-hydrogen binary powder heated by electrical coils.

6. A calibration apparatus as in claim 1 wherein said means for limiting the conductance is an orifice.

7. A calibration apparatus as in claim 1 wherein said self-generating gas source is a metal-gas binary powder heated by electrical coils; and said means for negating the conductance limitation is a mechanism for moving said conductance limitation so as to cancel its effects.

8. A calibration apparatus as in claim 1 wherein said self-generating gas source is a metal-gas binary powder heated by electrical coils;
   said means for limiting conductance is an orifice;
   said means for negating the conductance limitation is a mechanism for retracting said orifice; and
   said measuring means is a thermocouple and its associated indicating device.

9. A calibration apparatus as in claim 1 wherein the enclosure containing the self-generating gas source is attached to the vacuum system by means of a vacuum seal assembly which permits rapid substitution of said gas source.

10. A calibration apparatus as in claim 1 wherein the gas source consists of two separate and distinct gas sources capable of furnishing either of two different gases for calibration.

11. In a vacuum calibration system as in claim 1 wherein said means for negating said means for limiting the conductance is comprised of an orifice in one end of a movable body and a mechanism for moving said body so as to permit the flow of gas past said body thereby bypassing the orifice limiting effect, said mechanism being operable from outside said vacuum calibration system without affecting the vacuum integrity.

12. In a vacuum calibration system as in claim 1 a means of limiting the conductance and a means for negating said limiting effect comprised of an orifice at one end of a closed cylindrical body;

an operating mechanism for moving said body in a direction coaxial to said orifice;

said body being attached by a press fit onto said operating mechanism so as to complete a vacuum seal around said orifice when said body is moved to engage the edge of an exit port by extension of said operating mechanism;

a vacuum tight bellows forming a boundary around said operating mechanism permitting manual operation of said mechanism outside the vacuum to cause movement of said body within the vacuum system; and a multiplicity of aperatures on the cylindrical surface of said body to allow free flow of gas to said orifice through said body.

* * * * *